(12) United States Patent
Xu et al.

(10) Patent No.: US 8,952,795 B2
(45) Date of Patent: Feb. 10, 2015

(54) SELECTIVE GAIN CONTROL CIRCUIT

(75) Inventors: Zhihao Xu, Sunnyvale, CA (US); Guangbin Zhang, Cupertino, CA (US)

(73) Assignee: OmniVision Technologies, Santa Clara, CA (US)

( * ) Notice: Subject to any disclaimer, the term of this patent is extended or adjusted under 35 U.S.C. 154(b) by 148 days.

(21) Appl. No.: 13/605,919

(22) Filed: Sep. 6, 2012

(65) Prior Publication Data

US 2014/0062599 A1  Mar. 6, 2014

(51) Int. Cl.
*H04N 3/14* (2006.01)
*H04N 5/335* (2011.01)

(52) U.S. Cl.
USPC .......................... 340/300; 348/241; 348/255

(58) Field of Classification Search
CPC ....... H04N 5/378; H04N 5/335; H04N 3/155; H04N 5/3575; H03F 3/005
USPC ............. 348/207.99, 229.1, 230.1, 241–251, 348/294–324, 362, 255; 257/222, 223, 257/225–234, 257, 258, 291, 292, 294, 440, 257/443–448; 341/143, 161, 172; 358/482, 358/513, 514; 250/208.1; 345/174; 330/278
See application file for complete search history.

(56) References Cited

U.S. PATENT DOCUMENTS

| | | | |
|---|---|---|---|
| 5,416,485 A * | 5/1995 | Lee ................................ | 341/172 |
| 6,420,991 B1 * | 7/2002 | Yu .................................. | 341/161 |
| 2003/0223010 A1 * | 12/2003 | Kaplinsky et al. ............ | 348/362 |
| 2007/0120725 A1 * | 5/2007 | Huang ........................... | 341/161 |
| 2009/0190018 A1 * | 7/2009 | Sakakibara ................... | 348/308 |
| 2011/0261008 A1 * | 10/2011 | Joharapurkar et al. ....... | 345/174 |
| 2013/0278454 A1 * | 10/2013 | Schmid et al. ................ | 341/143 |

* cited by examiner

*Primary Examiner* — Dennis Hogue
(74) *Attorney, Agent, or Firm* — Blakely Sokoloff Taylor & Zafman LLP

(57) ABSTRACT

A circuit for providing signal amplification with reduced fixed pattern noise. In an embodiment, the circuit includes an amplifier and a plurality of legs coupled in parallel with one another between a first node for an input of the amplifier and a second node for an output of the amplifier. Control logic selects a first combination of the plurality of legs for a first configuration of the circuit to provide a first loop gain with the amplifier. In another embodiment, the control logic further selects a second combination of the plurality of legs for a second configuration of the circuit to provide a second loop gain with the amplifier, wherein the first loop gain is substantially equal to the second loop gain.

14 Claims, 7 Drawing Sheets

SELECTIVE GAIN CONTROL CIRCUIT

BACKGROUND

1. Technical Field of the Invention

This disclosure relates generally to signal amplification and in particular, but not exclusively, to image sensor readout circuitry.

2. Background Art

Image sensors have become ubiquitous. They are widely used in digital still cameras, cellular phones, security cameras, as well as, medical, automobile, and other applications. The technology used to manufacture image sensors, and in particular, complementary metal oxide semiconductor (CMOS) image sensors, has continued to advance at a great pace. For example, the demands of higher resolution, high quality images and lower power consumption have encouraged the further miniaturization and integration of these CMOS image sensors. However, fixed pattern noise (FPN) is a known issue for CMOS image sensors. FPN is a spatial variation in pixel outputs under uniform illumination due to device and interconnect mismatches within an image sensor. FPN may present itself in a resultant image as some pattern of brighter or dimmer pixels occurring with images taken under the same temperature and exposure.

Conventional methods of reducing column FPN in image sensors include correlated double sampling (CDS), in which a reference signal (or black signal level) is amplified and sampled before resetting a pixel cell. During subsequent image acquisition, the reset pixel cell is exposed to light and charged to produce an image signal. The image signal is amplified, sampled and compared with the sampled reference signal (i.e., black signal is subtracted from the image signal) to arrive at a final value (i.e., the resultant image signal). Accuracy of CDS is limited due to non-linearity and variation of column sampling circuits. As a result, there is normally still an amount of column FPN left even after methods such as CDS is applied.

One source of FPN is capacitor mismatch induced gain error. As pixel cell size continues to decrease in successive generations of image sensor devices, the contribution of capacitor mismatch to induced gain error is becoming more significant.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments of an amplification circuit having reduced FPN, and method for use thereof, are described herein. Process variations during semiconductor fabrication processes may result in variations in the attributes of circuit elements, such transistor length, width, oxide thickness and/or the like. These minor variations may cause a mismatch between semiconductor elements, and as semiconductor feature size decrease, these minor variations may affect the signal output of a particular circuit. Certain embodiments discussed herein variously reduce effects of such process variations—e.g. including variously accessing different combinations of elements of a readout circuit to implement substantially the same loop gain. As referred to herein, gains—e.g. including loop gains—are to be considered substantially equal if each of the respective gains is within 10% of one of the gains.

Figure 1:
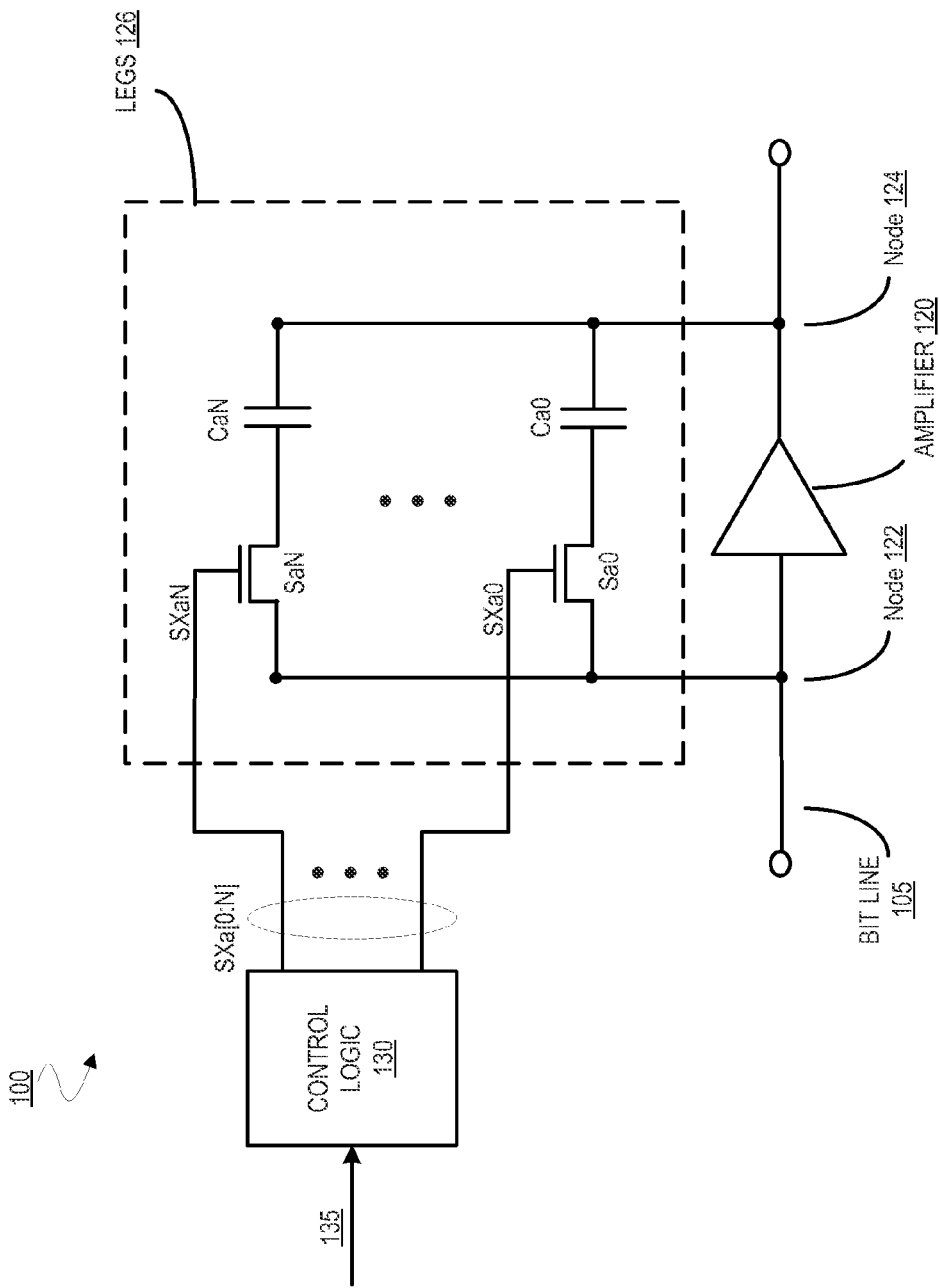
FIG. 1 is a circuit diagram illustrating elements of a gain control circuit according to an embodiment.

FIG. 1 illustrates elements of circuit 100 for providing signal amplification according to an embodiment. Various embodiments are discussed herein with respect to techniques and mechanisms for amplifying a signal generated by image sensor hardware. For example, circuit 100 may operate in or with such image sensor hardware, although certain embodiments are not limited in this regard. Such discussion may be extended, however, to apply to any of a variety of additional or alternative types of signals for amplification using such techniques and mechanisms.

Circuit 100 may include bit line 105 and amplifier 120 coupled between node 122 and node 124, where amplifier 120 is to receive via node 122 a signal of bit line 105. In an embodiment, such a signal is received via node 122 when circuit 100 has a particular configuration. The configuration may include, for example, a configured feedback across amplifier 120 to provide a corresponding loop gain. Based on the signal received at node 122 and the loop gain provided by the configuration, amplifier 120 may generate an output signal at node 124.

Circuit 100 may be configured at different times according to any of multiple different configurations. Each of the multiple configurations may, for example, correspond to a respective level for some characteristic of feedback across amplifier 120. The respective levels may, in turn, each correspond to a respective loop gain. For example, the multiple configurations may each correspond to a respective total amount of impedance (e.g. including one or more of resistance, capacitance and inductance) for feedback provided by one or more circuit elements of circuit 100. Certain features of various embodiments are discussed herein with respect to configuring a circuit for a level of feedback capacitance. However, such discussion may be extended to apply to circuit configuration for a level of any of a variety of additional or alternative feedback characteristics.

In an embodiment, circuit 100 includes plurality of legs 126 which are each coupled in parallel with one another between nodes 122, 124. In an embodiment, the total number of the plurality of legs 126 is $2^X$, where X is some positive integer. Configuration of circuit 100 may include selectively configuring different ones of legs 126 each to be variously included in, or excluded from, contributing to feedback across amplifier 120. For example, legs 126 may include some N+1 individual legs which each include a respective one of switches Sa0, . . . , SaN (represented as respective transistors) and a respective one of loads Ca0, . . . , CaN (represented as respective capacitors). Some or all of legs 126 may each include any of a variety of other switches and/or loads, according to various embodiments.

Some or all of switches Sa0, . . . , SaN may be switched independent of one another, in an embodiment. A given configuration of circuit 100 may, for example, include a particular combination of switch states each for a respective one of switches Sa0, . . . , SaN. Each such switch state may, for example, include one of a closed switch state for allowing the corresponding leg to contribute to feedback across amplifier 120, and an open switch state for preventing the corresponding leg from contributing to feedback across amplifier 120.

Circuit 100 may include control logic 130 coupled to legs 126, where, for implementing a particular configuration of circuit 100, control logic 130 is to selectively include various ones of legs 126 in—and/or exclude various ones of legs 126 from—providing feedback across amplifier 120. By way of illustration and not limitation, control logic 130 may receive a signal 135 indicating a gain, such as a loop gain, to be applied in processing the signal of bit line 105. The particular agent (not shown) which provides signal 135 may not be limiting on certain embodiments. For example, signal 135 may be an a priori control message received from any of a variety of types of gain control logic—e.g. including conventional gain control hardware.

In an embodiment, signal 135 directly or indirectly identifies a level of a feedback characteristic—such as a level of feedback capacitance—for implementing a loop gain with amplifier 120. Control logic 130 may include or otherwise have access to logic—e.g. a look-up table or other such data, a state machine and/or the like—which associates different configurations of circuit 100 each with a respective level of the feedback characteristic. Such configurations of circuit 100 may each include a different respective combination of legs 126—e.g. where each of the combination of legs 126 includes a different respective combination of switch states for switches Sa0, . . . , SaN. Based on signal 135, control logic 130 may generate one or more signals, represented by the illustrative set of signals SXa[0:N], to variously configure respective ones of legs 126. For example, the set of signals SXa[0:N] may include a signal SXa0 to set a switch state of switch Sa0 and/or a signal SXaN to independently set another switch state of switch SaN. Any of a variety of additional or alternative switch signals may be provided by control logic 130, according to different embodiments.

In an embodiment, a plurality of configurations are each associated with the same loop gain—e.g. where the plurality of configurations are each to provide substantially the same level of the feedback characteristic for implementing the loop gain. By way of illustration and not limitation, the respective capacitances of loads Ca0, . . . , CaN may be substantially equal to one another, in an embodiment. As referred to herein, capacitances are to be considered substantially equal if each of the respective capacitances is within 10% of one of the capacitances. In such an embodiment, any combination of exactly M of the N+1 legs in legs 126 (where M is some positive integer less than N+1) may provide substantially the same feedback capacitance and, for example, substantially the same loop gain.

Control logic 130 may select from a plurality of configurations of circuit 100 which each provide a respective loop gain substantially equal to that indicated by signal 135. For example, such a plurality of configurations may each include a different combination of exactly M of legs 126 being configured to contribute to feedback across amplifier 120. Selecting from the plurality of configurations may, for example, include control logic 130 selecting from a plurality of values each mapped to or otherwise identifying a respective configuration of circuit 100. For example, control logic 130 may identify a set of configurations as being associated with the gain level indicated by signal 135. After identification of the set of configurations, control logic 130 may select some first configuration from the identified set of configurations. In an embodiment, the first configuration may be selected based upon a selection algorithm such as a pseudo-random selection algorithm, a round-robin selection algorithm and/or the like.

At some later point in time, control logic 130 may select from the identified set of configurations a second configuration for implementing substantially the same loop gain as that corresponding to the first configuration. Based on such selection, control logic 130 may send a different set of values for SXa[0:N] in parallel to variously configure legs 126. Variation between the first configuration and the second configuration, each to implement substantially the same feedback capacitance (e.g. to implement substantially the same loop gain), may contribute to reduction of FPN in the processing of image signal.

For example, the selection algorithm may prevent or otherwise limit the possibility of some pattern in processing multiple signals with readout circuit 100. In an embodiment, the selection algorithm limits the possibility of the same combination of legs 126 being used to process successive signals on bit line 105. Alternatively or in addition, the selection algorithm may limit the possibility of a pattern between processing of the signal of bit line 105 and processing of another signal by other amplifier circuitry (not shown) of circuit 100. In limiting the possibility of such patterns, the likelihood of fixed pattern noise may be reduced.

Figure 2:
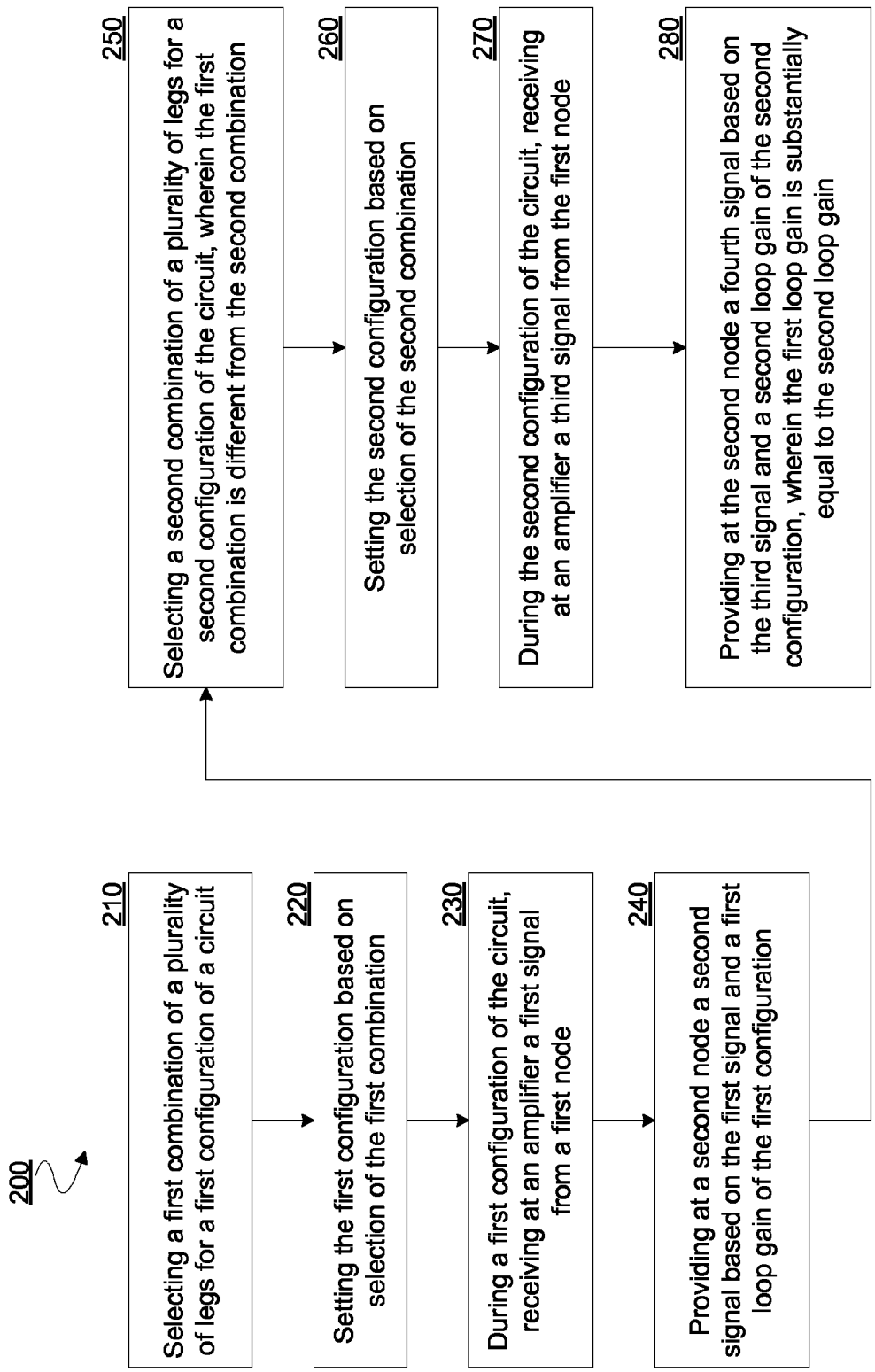
FIG. 2 is a flow diagram illustrating elements of a method for operating a gain control circuit according to an embodiment.

FIG. 2 illustrates elements of method 200 for providing signal amplification according to an embodiment. Method 200 may be performed by a circuit having some or all of the features of circuit 100, for example.

Method 200 may include, at 210, selecting a first combination of a plurality of legs for a first configuration of the circuit. The plurality of legs—e.g. having some or all of the features of legs 126—may each be coupled in parallel with one another to a first (amplifier input) node and to a second (amplifier output) node. Each of the plurality of legs may include a respective load and a respective switch, although certain embodiments are not limited in this regard. In an embodiment, each of the loads of the plurality of legs has a respective level of an impedance characteristic—e.g. including a respective level of a capacitance, resistance or inductance—wherein the respective levels of the impedance characteristic are substantially equal to one another.

The first combination may selected at 210 from a plurality of configurations—e.g. based on a pseudo-random selection algorithm, a round-robin selection algorithm and/or any of a variety of other such algorithms. In an embodiment, the first combination is selected at 210 from a plurality of configurations in response to a signal indicating a reference loop gain. Such a plurality of configurations may include configurations each corresponding to a respective loop gain which is substantially equal to the reference loop gain. In certain embodiments, each of the plurality of configurations corresponds to a respective loop gain substantially equal to the reference loop gain.

Method 200 may further include, at 220, setting the first configuration based on selection of the first combination. For example, selecting the first configuration may include selecting a first combination of switch states each for a respective one of the switches of the plurality of legs. In such an embodiment, the setting of the first configuration may include control logic—e.g. control logic 130—variously providing control signals to set respective switch states for each of the plurality of legs. Method 200 may further include, at 230, receiving at an amplifier a first signal from the first node, where the first signal is received during a first configuration of the circuit. Based on the first signal and a first loop gain of the first configuration, method 200 may, at 240, provide a second signal at the second node.

Method 200 may further include, at 250, selecting a second combination of the plurality of legs for a second configuration of the circuit, wherein the first combination is different from the second combination. For example, for at least one of the switches of the plurality of legs, a switch state of the switch for the first configuration may be different from a switch state of that same switch for the second configuration. Selection of the second combination at 250 may be according to a selection algorithm which is also used for the selecting at 210.

Based on selection of the second combination at 250, method 200 may include, at 260, setting the second configuration. Setting the second configuration at 260 may include control logic variously providing control signals to set respective switch states for each of the plurality of legs. Method 200 may further include, at 270, receiving at the amplifier a third signal from the first node, wherein the third signal is received during the second configuration of the circuit. Method 200 may further include, at 280, providing at the second node a fourth signal which is based on the third signal and a second loop gain of the second configuration. In an embodiment, the first loop gain is substantially equal to the second loop gain.

Figure 3:
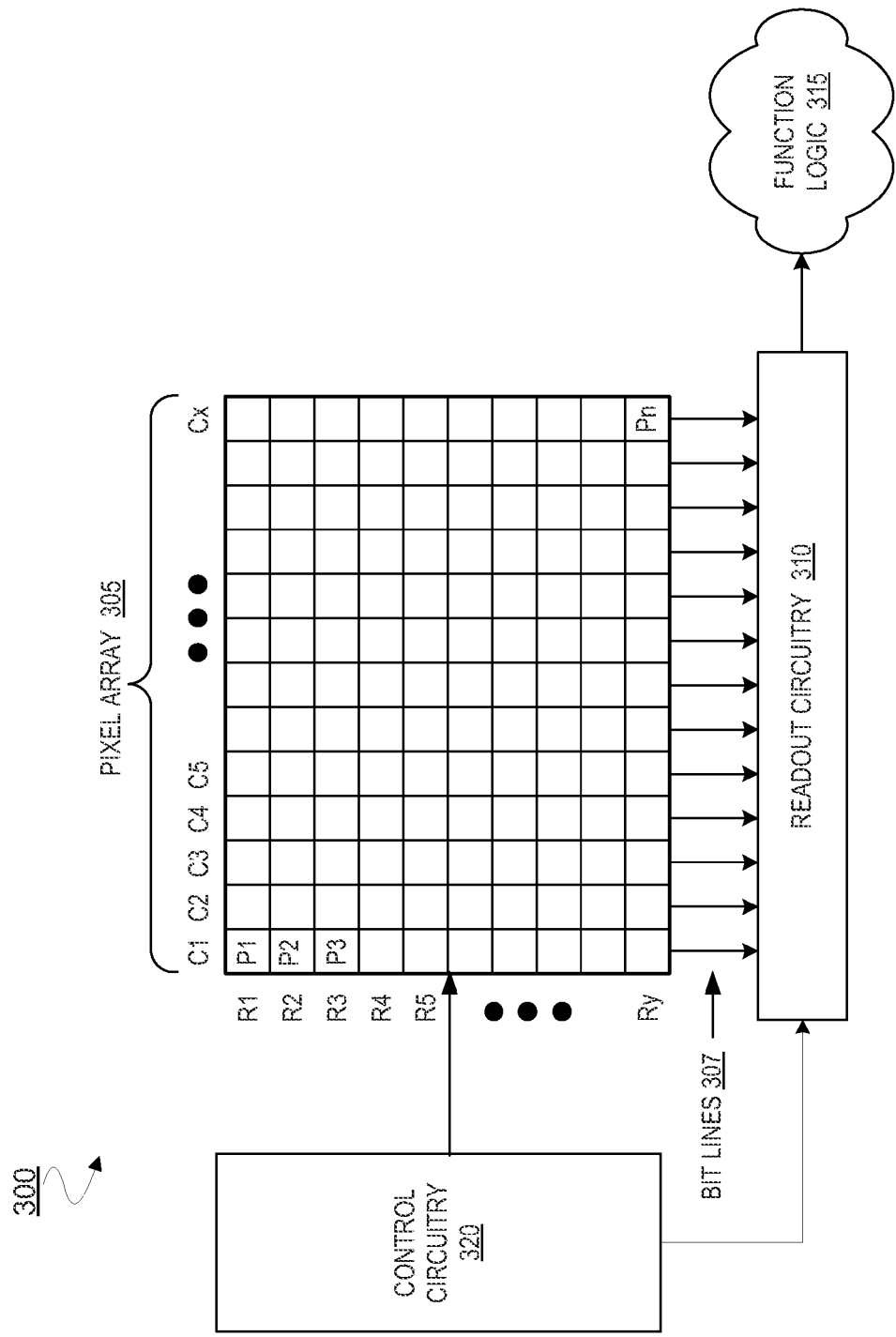
FIG. 3 is a block diagram illustrating elements of an imaging system including a gain control circuit according to an embodiment.

FIG. 3 is a block diagram illustrating an image sensor system 300 including signal amplification circuitry according to an embodiment. The illustrated embodiment of image sensor system 300 includes a pixel array 305, readout circuitry 310, function logic 315, and control circuitry 320.

Pixel array 305 may comprise rows and columns of pixel cells (e.g., pixels P1, P2 . . . , Pn). In one embodiment, each pixel is a complementary metal-oxide-semiconductor ("CMOS") pixel. Pixel array 305 may be implemented as a frontside illuminated image sensor or a backside illuminated image sensor. As illustrated, each pixel is arranged into a row (e.g., rows R1 to Ry) and a column (e.g., column C1 to Cx) to acquire image data of a person, place, or object, which can then be used to render an image of the person, place, or object.

After each pixel has acquired its image data or image charge, the image data may be readout via bit lines 307 by readout circuitry 310 and transferred to function logic 315. Readout circuitry 310 may include amplification circuitry, analog-to-digital ("ADC") conversion circuitry, or otherwise. In an embodiment, readout circuitry 310 includes signal gain components to amplify a signal from one of bit lines 307. Configuration of such signal gain components may be controlled by control circuitry 320, for example. In another embodiment, circuitry to control pixel array 305 may be distinct from other control circuitry to selectively configure signal gain components of readout circuitry 210.

Function logic 315 may simply store the image data or even manipulate the image data by applying post image effects (e.g., crop, rotate, remove red eye, adjust brightness, adjust contrast, or otherwise). In one embodiment, readout circuitry 310 may readout a row of image data at a time along readout column lines (illustrated as generic bit lines) or may readout the image data using a variety of other techniques (not illustrated), such as a serial readout, column readout along readout row lines, or a full parallel readout of all pixels simultaneously.

Control circuitry 320 may be coupled to pixel array 305 and may include logic for controlling operational characteristic of pixel array 305. For example, reset, row select, and transfer signals may be generated by control circuitry 320, as discussed below. Additionally, dual conversion gain signals or FD boost signals, as discussed below, may also be generated by control circuitry 320. In one embodiment, control circuitry 320 may include photosensitive circuitry to measure the intensity of light impinging upon pixel array 305 and adjust the control signals accordingly.

Figure 4:
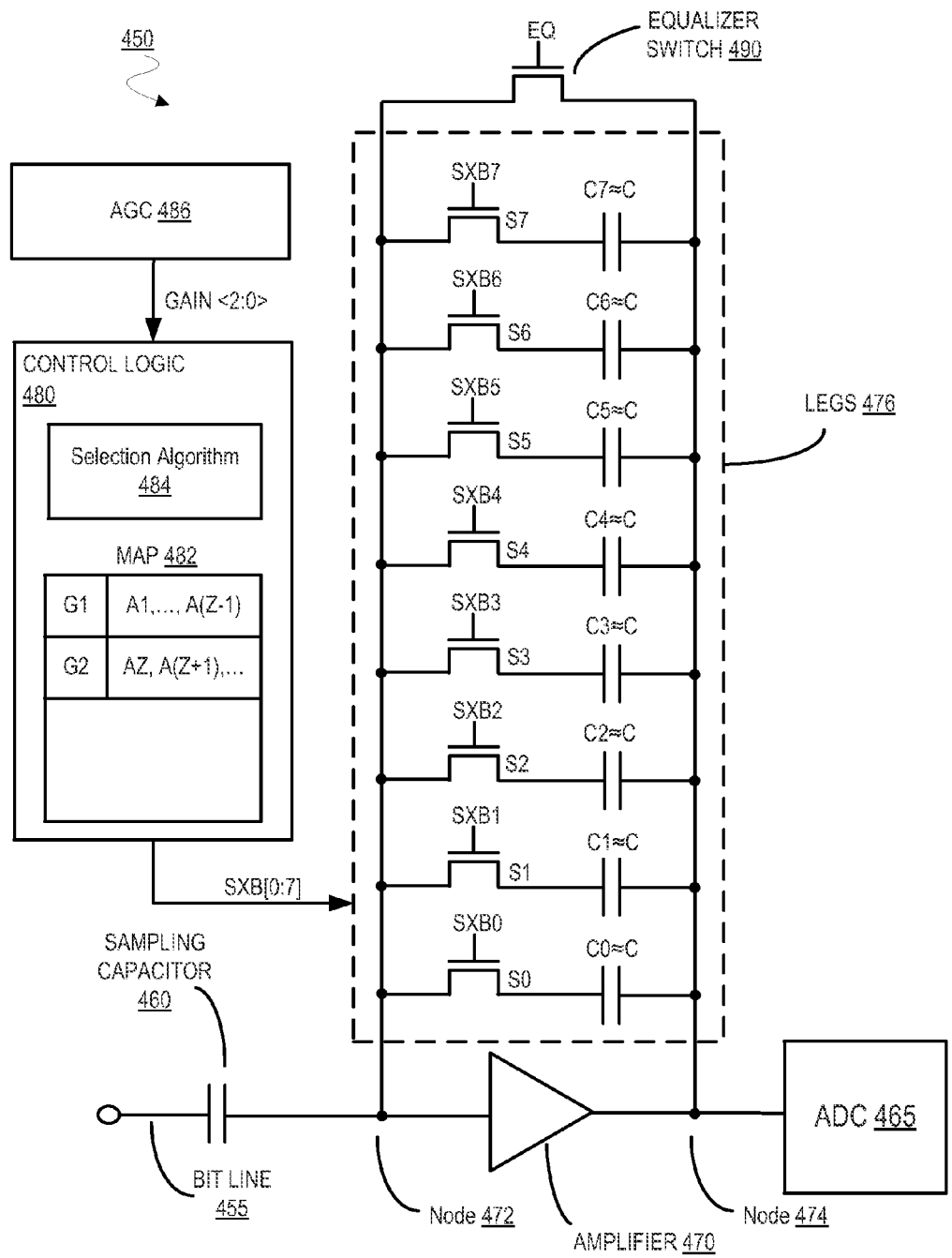
FIG. 4 is a circuit diagram illustrating elements of a readout circuit according to an embodiment.

FIG. 4 illustrates elements of readout circuit 450 for providing signal amplification according to an embodiment. Readout circuit 450 may include some or all of the features of circuit 100, for example. In an embodiment, readout circuit 450 is to provide some or all of the functionality of readout circuitry 310. Multiple implementations of readout circuit 450 may each be dedicated to signal processing for a respective column of pixel array 305 of FIG. 3, for example. In other embodiments, one or more elements of readout circuit 450 may be shared by multiple columns of pixel array 305.

In an embodiment, readout circuit 450 includes bit line 455, sampling capacitor 460 coupled thereto, and amplifier 470 coupled between node 472 and node 474, where amplifier 470 is to receive via node 472 a signal based on a charge stored in sampling capacitor 460. Readout circuit 450 may further comprise analog-to-digital converter logic ADC 465, automatic gain control logic AGC 486, and control logic 480 for various operations to configure and/or operate readout circuitry 450.

In an embodiment, amplifier 470 receives an image data signal via node 472 when circuit 450 has a particular configuration. The configuration may include, for example, a configured feedback across amplifier 470 to provide a corresponding loop gain. Based on the signal received at node 472 and the loop gain provided by the configuration, amplifier 470 may provide at node 474 an output signal for ADC 465

In an embodiment, circuit 450 includes eight (8) legs 476 which are each coupled between nodes 472, 474, where legs 476 are in parallel with one another. Configuration of circuit 450 may include selectively configuring different ones of legs 476 each to be variously included in, or excluded from, contributing to feedback across amplifier 470. For example, legs 476 may each include a respective one of switches S0, S1, . . . , S7 (represented as respective transistors) and a respective one of capacitors C0, C1, . . . , C7—e.g. where switches S0, S1, . . . , S7 are each coupled between the input of amplifier 470 and a corresponding one of capacitors C0, C1, . . . , C7. As illustrated in FIG. 4, the respective capacitance of each of capacitors C0, C1, . . . , C7 are substantially equal to one another—e.g. where each is approximately equal to capacitance level C.

Switches S0, S1, . . . , S7 may each operate independent of one another in response to respective control signals SXB0, SXB1, . . . , SXB7. Switches S0, S1, . . . , S7 may each switchedly couple a corresponding one of feedback capacitors C0, C1, . . . , C7 between the input and output of amplifier 470. Equalizer switch 490 may be further coupled between the input and output of amplifier 470, although certain embodiments are not limited in this regard. When activated by equalizer signal EQ, equalizer switch 490 may cancel an offset of amplifier 470, for example.

A loop gain for signal amplification with amplifier 470 may be adjusted by changing the feedback capacitance coupled between the input and output of the amplifier 470. In an embodiment, a ratio between sampling capacitor 460 and a total feedback capacitance for a given configuration determines a factor by which gain of amplifier 470 is increased. By way of illustration and not limitation, where amplifier 470 itself has an gain of one (1×) and sampling capacitor 460 has a capacitance of 8C, the total loop gain for signal amplification with amplifier 470 may be increased to four (4×) by applying a feedback capacitance of 2C—e.g. by asserting a total of two of the eight control signals SXB0, SXB1, . . . , SXB7. Similarly, the total loop gain for signal amplification with amplifier 470 may be set to one (1×) by applying a feedback capacitance of 8C—e.g. by asserting all of the eight control signals SXB0, SXB1, . . . , SXB7.

In an illustrative scenario for one embodiment, AGC 486 determines a total gain for signal amplification between nodes 472, 474—e.g. to compensate for variations in lighting conditions, such as for indoor or outdoor lighting. A total gain that is too high may result in an image that is overly bright and washed out. In contrast, a total gain that is too small may result in an image that is dark and difficult to view. Many known methods may be used to determine a gain level, such as on-chip or off-chip light-intensity sensing circuits or feedback circuits which determine the gain of a next frame of image data based on a current frame of image data. AGC 486 may communicate information—e.g. including a value for three-bit binary GAIN<2:0>—identifying such a gain level to control logic 480. In an alternate embodiment, some or all of the functionality of AGC 486 is incorporated into control logic 480.

Control logic 480 may include some of all of the features of control logic 130, for example. In an embodiment, control logic 480 includes circuitry to identify, for some gain level indicated by GAIN<2:0>, a plurality of different combinations of legs 476 as being associated with that gain level. By way of illustration and not limitation, control logic 480 may include or have access to map 482—e.g. including a lookup table or other such data structure—including reference information which associates some gain level G1 with combination values A1, . . . , A(Z-1) which each correspond to a different respective combination of legs 476. A given combination value may specify for each of legs 476, whether that leg is to be included in contributing to a particular feedback or whether that leg is to be excluded from contributing to that feedback. For example, a combination value comprising a plurality of bits, each bit corresponding to a different respective leg of legs 476, where the respective value of each bit specifies whether the switch of the corresponding leg is to be open or closed for implementing the combination.

In an embodiment, A1, . . . , A(Z-1) are each for configuring legs 476 to provide substantially the same total feedback capacitance. For example, A1, . . . , A(Z-1) may each identify the same total number of switches to be closed (or open). By contrast, map 482 may further associate some other gain level G2 with other combination values AZ, A(Z+1), . . . etc. which each correspond to a different respective combination of legs 476. Combination values AZ, A(Z+1), . . . etc. may each be for configuring legs 476 to provide substantially the same total feedback capacitance, where that total feedback capacitance is substantially different from that provided by any of the combinations corresponding to A1, . . . , A(Z-1). For example, AZ, A(Z+1), . . . etc. may each identify the same total number of switches to be closed (or open), where that total number is different than the total number variously specified by each of A1, . . . , A(Z-1). The gains G1, G2 and their corresponding sets of combination values are merely illustrative, and are not limiting on certain embodiments.

In an embodiment, control logic 480 is to perform selection algorithm 484 for selecting, at various times, different combinations of legs 476 for a given gain level. By way of illustration and not limitation, AGC 486 may send to control logic 480 a first message including a first value of GAIN<2:0>—e.g. the first value indicating gain level G1. In response to the first message, selection algorithm 484 may select a first one of combination values A1, . . . , A(Z-1) and, based on the selection, provide a first value for parallel output SXB[0:7]. Component signals SXB0, SXB1, . . . , SXB7 of parallel output SXB[0:7] may variously close or open respective ones of switches S0, S1, . . . , S7 to implement a configuration of legs 476 for providing a first gain substantially equal to G1. One or more signals may be amplified with amplifier 470 during such a configuration of legs 476.

Subsequently, AGC 486 may send to control logic 480 a second message which also indicates gain level G1 with GAIN<2:0>. In response to the second message, selection algorithm 484 may select a second, different one of combination values A1, . . . , A(Z-1). Based on such selection, control logic 480 may provide a second value for parallel output SXB[0:7] to implement a second configuration of legs 476 which, nevertheless, also provides a gain substantially equal to G1. One or more other signals may be amplified with amplifier 470 during such a second configuration of legs 476.

Figure 5:
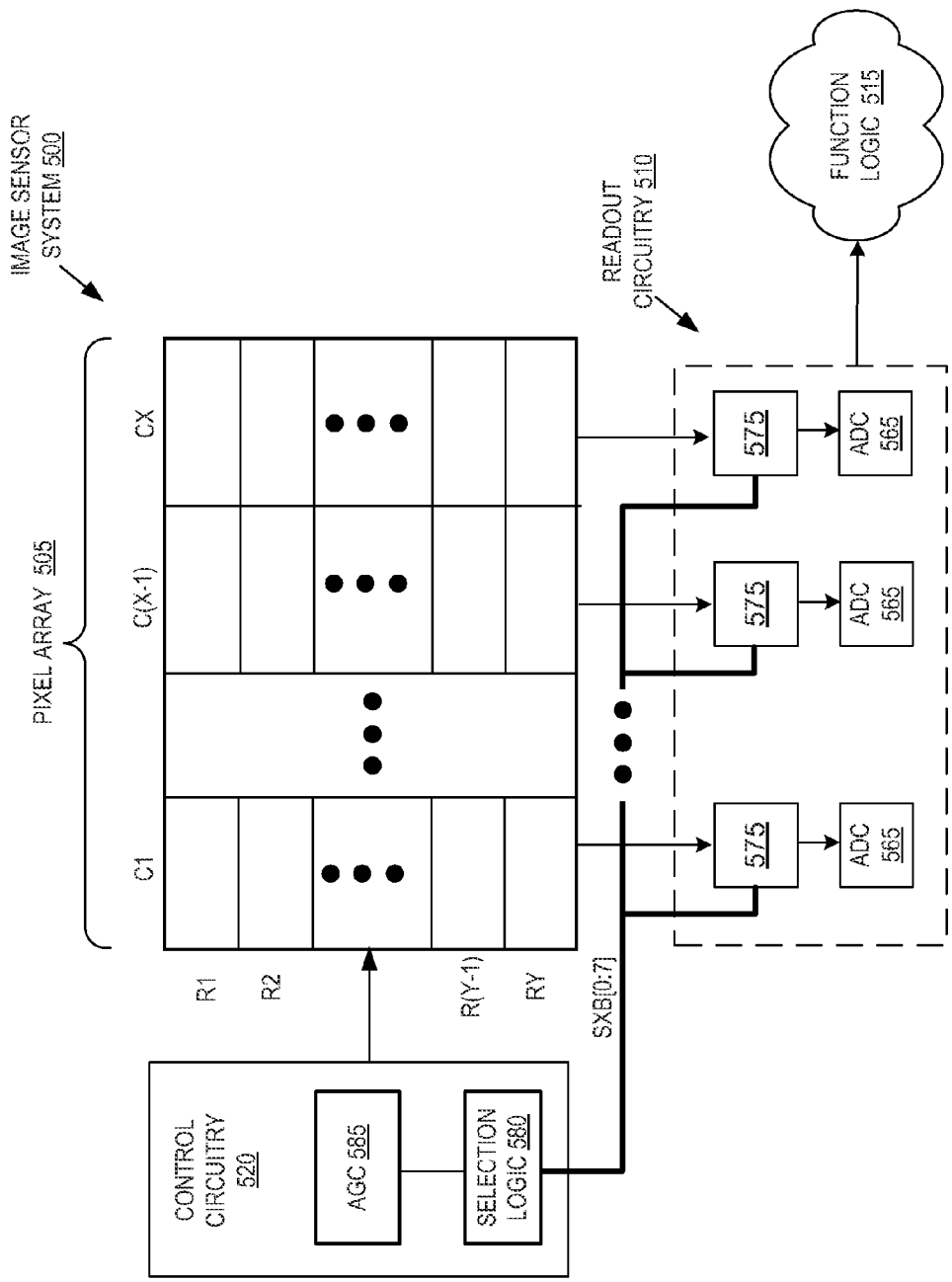
FIG. 5 is a block diagram illustrating elements of an imaging system according to an embodiment.

FIG. 5 illustrates elements of an image sensor system 500 according to an embodiment. Image sensor system 500 may include some or all of the features of image sensor system 300. For example, image sensor system 500 may include pixel array 505, control circuitry 520, readout circuitry 510 and function logic 515 corresponding, respectively, to pixel array 305, control circuitry 320, readout circuitry 310 and function logic 315. Control circuitry 520 may include automatic gain control logic AGC 585 to provide functionality corresponding to that of AGC 486, for example. Control circuitry 520 may further include selection logic 580 to provide functionality corresponding to that of selection algorithm 484 and, in an embodiment, map 482.

Readout circuitry 510 may include a respective column amplifier circuit for each of columns C1, . . . , CX of pixel array 505. In an embodiment, each of the respective column amplifier circuits includes features of circuit 100—e.g. where functionality of control logic 130, implemented in control circuitry 520, is shared by the column amplifier circuits. For example, the respective column amplifier circuits of readout circuitry 510 may each include respective legs 575, which each correspond to legs 126, and analog-to-digital converter logic ADC 565 for converting a signal amplified with the respective legs 575.

In an illustrative scenario according to an embodiment, AGC 585 and selection logic 580 produce global control signals SXB[7:0] which are provided concurrently to configure each of the respective legs 575 for all column amplifiers in readout circuit 510. For example, a value for control signals SXB[7:0] may be generated once for each frame of image data, where the same value is applied globally to all the column amplifiers to read out each row of pixel array 505 for a particular frame. Control signal SXB[7:0] may be generated more than once during each frame, or frame-triggered, so that a block of rows may be read out using a first value for control signals SXB[7:0]. In an embodiment, another block of rows may be readout using a second value for control signals SXB[7:0], where such a second set of values is for a different configuration of legs 575 that, for example, nevertheless implements substantially the same gain—e.g. substantially the same feedback capacitance—as that of the first value.

Figure 6:
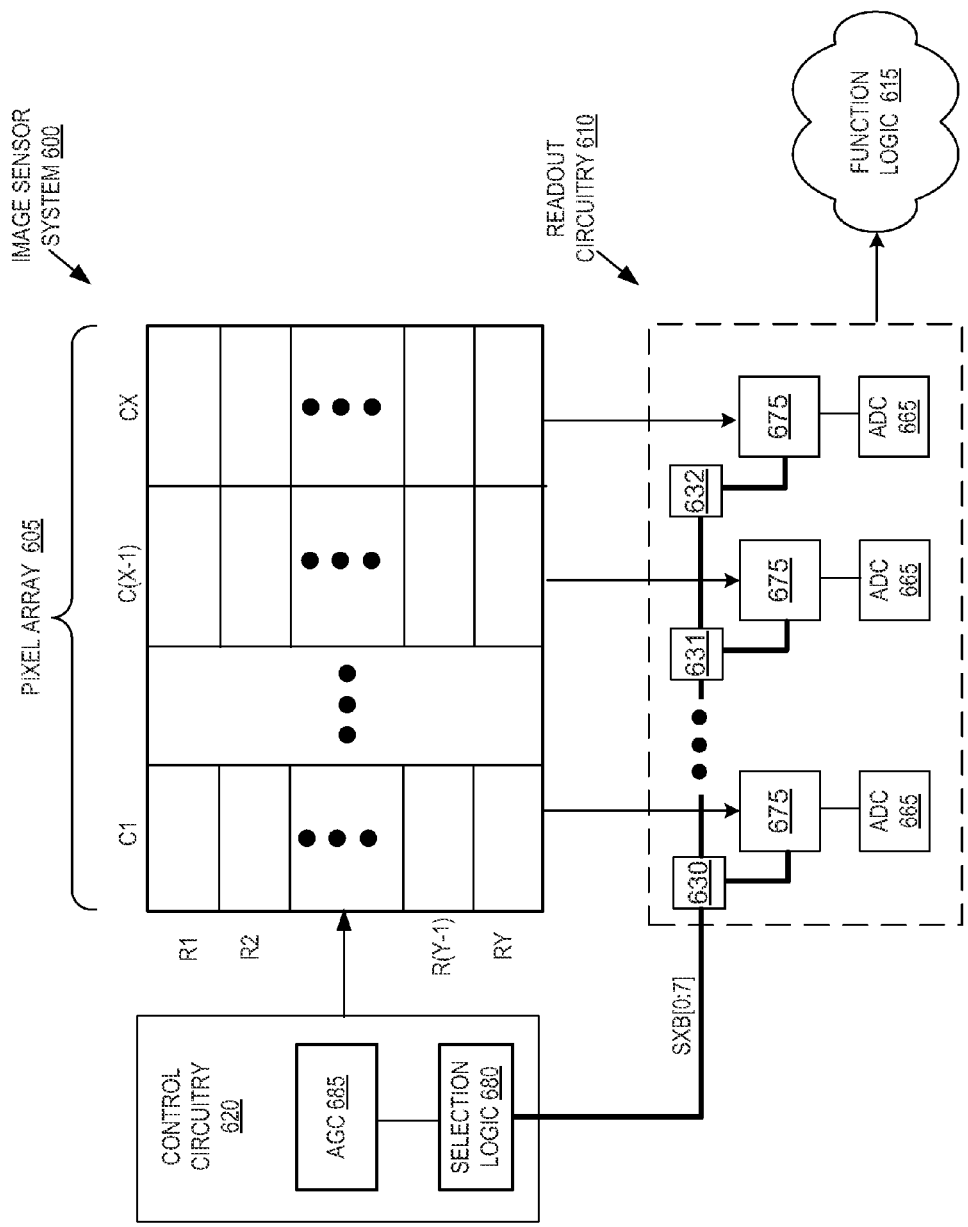
FIG. 6 is a block diagram illustrating elements of an imaging system according to an embodiment.

FIG. 6 illustrates elements of an image sensor system 600 according to an embodiment. Image sensor system 600 may include some or all of the features of image sensor system 300. For example, image sensor system 600 may include pixel array 605, control circuitry 620, readout circuitry 610 and function logic 615 corresponding, respectively, to pixel array 305, control circuitry 320, readout circuitry 310 and function logic 315. Control circuitry 620 may include automatic gain control logic AGC 685 to provide functionality corresponding to that of AGC 486, for example. Control circuitry 620 may further include selection logic 680 to provide functionality corresponding to that of selection algorithm 484 and, in an embodiment, map 482.

Readout circuitry 610 may include a respective column amplifier circuit for each of columns C1, . . . , CX of pixel array 605. In an embodiment, each of the respective column amplifier circuits includes features of circuit 100—e.g. where functionality of control logic 130, implemented in control circuitry 620, is shared by the column amplifier circuits. For example, the respective column amplifier circuits of readout circuitry 610 may each include respective legs 675, which each correspond to legs 126, and analog-to-digital converter logic ADC 665 for converting a signal amplified with the respective legs 675.

AGC 685 and selection logic 680 may produce different values for global control signals SXB[7:0], which are successively shifted through a sequence of readout registers 630, . . . , 631, 632 of readout circuitry 610. An example of such successive shifting according to an embodiment is shown in a timing diagram 700 of FIG. 7. The first four of readout registers 630, . . . , 631, 632 are representing in FIG. 7 as readout registers RR0 630, RR1 720, RR2, 730 and RR4 740.

In an illustrative scenario according to an embodiment, an initialization state of image sensor system 600 includes loading a default value—such as "11111111", or ONE—into each of readout registers 630, . . . , 631, 632 with control signals SXB[7:0]. Before a first row, RY, is read out, AGC 685 and selection logic 680 may output a first value A0 with control signals SXB[7:0], where A0 which is shifted into RR0 630. During the readout of row RY at a time t1, readout registers 630, 720, 730, 740 hold control signal values A0, ONE, ONE and ONE, respectively.

Figure 7:
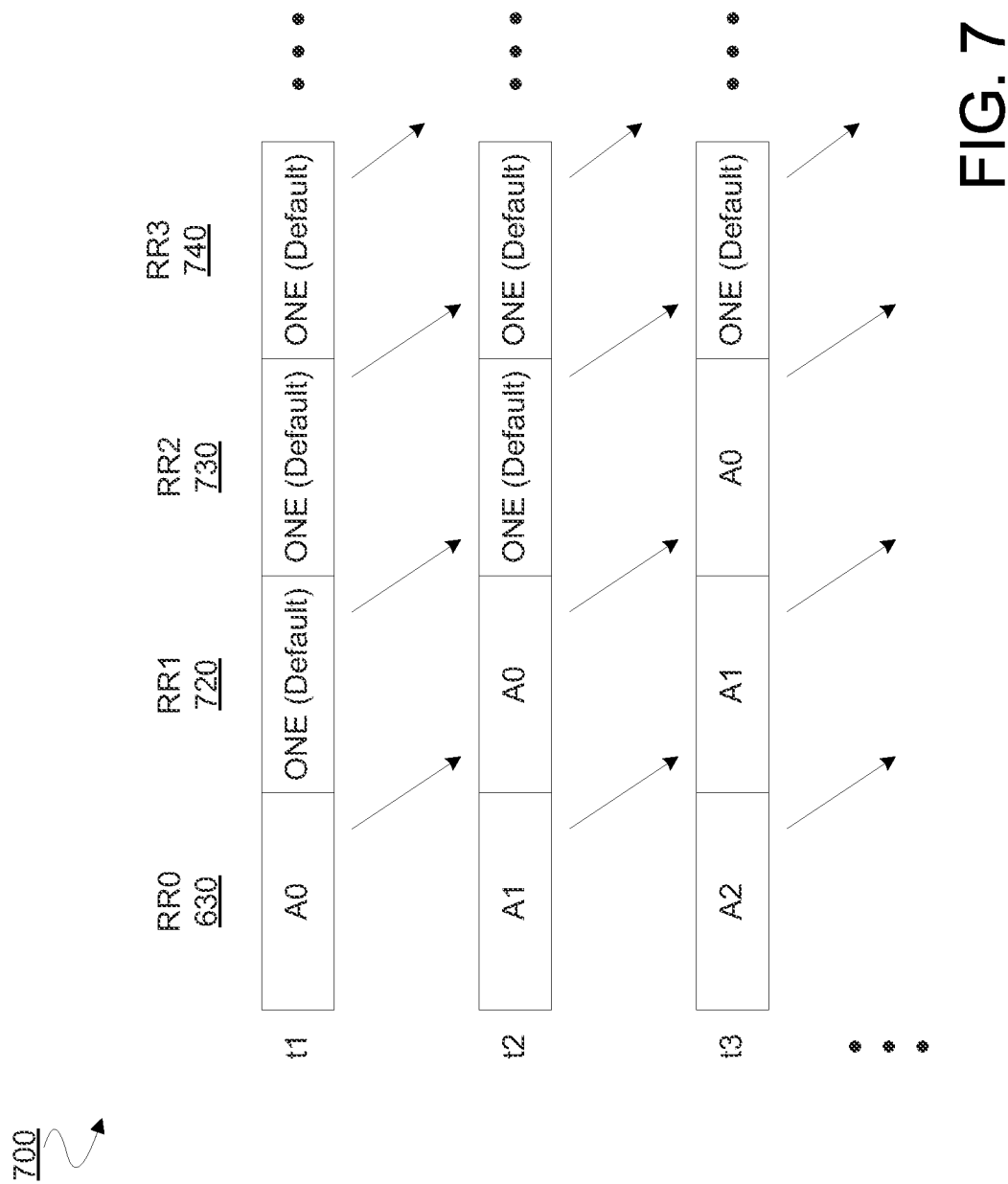
FIG. 7 is a timing diagram illustrating elements of signaling in a gain control circuit according to an embodiment.

Before a second row, R(Y−1) is read out, selection logic 680 outputs a second set of values A1 for control signals SXB[7:0], which is shifted into RR0 630, while the preceding contents A0 of RR0 630 are shifted into RR1 720. Referring to FIG. 7, during the read out of row R(Y−1) at time t2, readout registers 630, 720, 730, 740 hold control signal values A1, A0, ONE and ONE, respectively. Similarly, selection logic 680 may subsequently output a third set of values A2 for control signals SXB[7:0], where, during readout of row R(Y−2) at time t3, readout registers 630, 720, 730, 740 hold control signal values A2, A1, A0 and ONE respectively. In an embodiment, two or more of A0, A1, A2, etc. are different values which each specify the same total number of legs 675 which are to variously contribute to substantially the same amount of feedback capacitance. The variety in implementing substantially the same feedback capacitance—e.g. in implementing substantially the same loop gain—allows variation in fabrication, within and/or across the respective legs 675, to be averaged out in the processing multiple image signals.

Techniques and architectures for providing signal amplification are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, data or other signal.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
    a plurality of circuits each to couple to a different respective column of a pixel array, the plurality of circuits each including:
        a plurality of legs each coupled to a first node of the circuit and a second node of the circuit, wherein the plurality of legs of the circuit are in parallel with one another, each of the plurality of legs of the circuit including a respective load and a respective switch; and
        an amplifier to receive a respective first signal from the first node of the circuit during a first configuration of the circuit, to receive a respective second signal from the first node of the circuit during a second configuration of the circuit, to provide at the second node of the circuit a respective third signal based on the respective first signal and a respective first loop gain of the first configuration of the circuit, and to provide at the second node of the circuit a respective fourth signal based on the respective second signal and a respective second loop gain of the second configuration of the circuit, wherein the respective first loop gain is substantially equal to the respective second loop gain;
    control logic coupled to send first control signals and second control signals to each of the plurality of circuits, wherein for each of the plurality of circuits, the first control signals to select a respective first combination of the plurality of legs of the circuit to set the first configuration of the circuit, and the second control signals to select a respective second combination of the plurality of legs of the circuit to set the second configuration of the circuit, wherein the respective first combination is different from the respective second combination, wherein for each of the plurality of circuits, the control logic to select the respective first combination from a plurality of configurations in response to a signal indicating a reference loop gain, the plurality of configurations including configurations which each correspond to a respective loop gain substantially equal to the reference loop gain; and
    readout registers each coupled to a different respective one of the plurality of circuits, the readout registers arranged in a sequence, the control logic to successively shift the first control signals through the sequence and to successively shift the second control signals through the sequence.

2. The apparatus of claim 1, wherein the control logic to concurrently set the respective first configurations of each of the plurality of circuits.

3. The apparatus of claim 1, wherein for each of the plurality of circuits, the control logic to select the respective first combination from a plurality of configurations based on a pseudo-random selection algorithm.

4. The apparatus of claim 1, wherein for each of the plurality of circuits, the control logic to select the respective first combination from a plurality of configurations based on a round-robin selection algorithm.

5. The apparatus of claim 1, wherein for each of the plurality of circuits, the plurality of legs of the circuit comprises $2^X$ legs, where X is a positive integer.

6. The apparatus of claim 1, wherein for each of the plurality of circuits, each of the loads of the plurality of legs of the circuit has a respective level of an impedance characteristic, wherein the respective levels of the impedance characteristic are substantially equal to one another.

7. The apparatus of claim 6, wherein the impedance characteristic includes a capacitance.

8. An image sensor system comprising:
    a pixel including a plurality of columns;
    a plurality of circuits each coupled to a different respective column of the plurality of columns, each of the plurality of circuits including:
        a plurality of legs each coupled to a first node of the circuit and a second node of the circuit, wherein the plurality of legs of the circuit are in parallel with one another, each of the plurality of legs of the circuit including a respective load and a respective switch; and
        an amplifier to receive a respective first signal from the first node of the circuit during a first configuration of the circuit, to receive a respective second signal from the first node of the circuit during a second configuration of the circuit, to provide at the second node of the circuit a respective third signal based on the respective first signal and a respective first loop gain of the first configuration of the circuit, and to provide at the second node of the circuit a respective fourth signal based on the respective second signal and a respective second loop gain of the second configuration of the circuit, wherein the respective first loop gain is substantially equal to the respective second loop gain;
    control logic coupled to send first control signals and second control signals to each of the plurality of circuits, wherein for each of the plurality of circuits, the first control signals to select a respective first combination of the plurality of legs of the circuit to set the first configuration of the circuit, and the second control signals to select a respective second combination of the plurality of legs of the circuit to set the second configuration of the circuit, wherein the respective first combination is different from the respective second combination, wherein for each of the plurality of circuits, the control logic to select the respective first combination from a plurality of configurations in response to a signal indicating a reference loop gain, the plurality of configurations including configurations which each correspond to a respective loop gain substantially equal to the reference loop gain; and
    readout registers each coupled to a different respective one of the plurality of circuits, the readout registers arranged in a sequence, the control logic to successively shift the first control signals through the sequence and to successively shift the second control signals through the sequence.

9. The image sensor system of claim 8, wherein the control logic to concurrently set the respective first configurations of each of the plurality of circuits.

10. The image sensor system of claim 8, wherein for each of the plurality of circuits, the control logic to select the respective first combination from a plurality of configurations based on a pseudo-random selection algorithm.

11. The image sensor system of claim 8, wherein for each of the plurality of circuits, the control logic to select the respective first combination from a plurality of configurations based on a round-robin selection algorithm.

12. A method comprising:

sending first control signals and second control signals to each of a plurality of circuits, wherein the first control signals are successively shifted through a sequence of readout registers each coupled to a different respective one of the plurality of circuits, and wherein the second control signals are successively shifted through the sequence of readout registers; and at each of a plurality of circuits:

based on the first control signals, setting a first configuration of the circuit, including selecting a respective first combination of a plurality of legs of the circuit, the plurality of legs of the circuit each coupled to a first node of the circuit and a second node of the circuit, wherein the plurality of legs of the circuit are in parallel with one another, each of the plurality of legs of the circuit including a respective load and a respective switch;

during the first configuration of the circuit, receiving at an amplifier of the circuit a respective first signal from the first node of the circuit;

providing at the second node of the circuit a respective second signal based on the respective first signal and a respective first loop gain of the first configuration of the circuit;

based on the second control signals, setting a respective second configuration of the circuit, including selecting a respective second combination of the plurality of legs of the circuit, wherein the respective first combination is different from the respective second combination;

during the respective second configuration of the circuit, receiving at the amplifier of the circuit a respective third signal from the first node of the circuit; and providing at the second node of the circuit a respective fourth signal based on the respective third signal and a respective second loop gain of the respective second configuration, wherein the respective first loop gain is substantially equal to the respective second loop gain;

wherein for each of the plurality of circuits, the respective first combination is selected from a plurality of configurations in response to a signal indicating a reference loop gain, the plurality of configurations including configurations which each correspond to a respective loop gain substantially equal to the reference loop gain.

13. The method of claim 12, wherein the respective first configurations of each of the plurality of circuits are set concurrently with each other.

14. The method of claim 12, wherein for each of the plurality of circuits, the respective first combination is selected from a plurality of configurations based on a pseudo-random selection algorithm.

* * * * *